US006956082B1

(12) United States Patent  
Johnson et al.

(10) Patent No.: US 6,956,082 B1
(45) Date of Patent: Oct. 18, 2005

(54) INKJET INK COMPOSITION

(75) Inventors: Eric Alvin Johnson, Lansdale, PA (US); Carl Michael Hesler, New Egypt, NJ (US); Robert David Solomon, Souderton, PA (US); Michael Paul Hallden-Abberton, Maple Glen, PA (US)

(73) Assignee: Rohm and Haas Company, Philadelphia, PA (US)

( * ) Notice: Subject to any disclaimer, the term of this patent is extended or adjusted under 35 U.S.C. 154(b) by 954 days.

(21) Appl. No.: 09/718,588

(22) Filed: Nov. 22, 2000

Related U.S. Application Data

(60) Provisional application No. 60/170,555, filed on Dec. 14, 1999.

(51) Int. Cl.$^7$ ............................................. C08L 41/00
(52) U.S. Cl. ...................... 524/547; 524/555; 524/556
(58) Field of Search ............................. 524/547, 555, 524/556

(56) References Cited

U.S. PATENT DOCUMENTS

| | | | |
|---|---|---|---|
| 4,246,387 A | | 1/1981 | Deutsch |
| 5,942,560 A | | 8/1999 | Idogawa et al. ............. 523/161 |
| 5,965,634 A | * | 10/1999 | Idogawa et al. ............. 523/161 |
| 5,969,032 A | * | 10/1999 | Phan et al. .................. 524/460 |
| 6,232,369 B1 | * | 5/2001 | Ma et al. ..................... 523/161 |
| 6,693,147 B2 | * | 2/2004 | Johnson et al. ............. 524/547 |
| 6,743,875 B2 | * | 6/2004 | Johnson et al. ............. 526/240 |

FOREIGN PATENT DOCUMENTS

| | | | |
|---|---|---|---|
| EP | A-0747456 | | 5/1996 |
| EP | A-0869160 | | 3/1998 |
| EP | 0942048 A1 | | 9/1999 |
| JP | 62227435 | | 10/1987 |
| JP | 002165466 | | 3/1998 |
| JP | 10077435 | | 3/1998 |
| JP | 10176130 | * | 6/1998 |
| JP | 11012512 | * | 1/1999 |
| WO | WO 98/32726 | | 7/1998 |
| WO | WO 98/32773 | | 7/1998 |

* cited by examiner

*Primary Examiner*—Bernard Lipman
(74) *Attorney, Agent, or Firm*—Karl E. Stauss

(57) ABSTRACT

An emulsion-polymerized addition copolymer formed from a monomer mixture comprising ethylenically unsaturated monomers including from more than 4 to 15 wt % based on the weight of said mixture of at least one ethylenically unsaturated carboxylic acid functional monomer, and from 0.05 to 5 wt % based on the weight of said mixture of at least one polymerizable surfactant monomer, comprising hydrophobic and hydrophilic functional groups, wherein said hydrophilic functional group comprises a polymerizable group within it, is useful as a binder in an ink jet ink having improved print quality.

6 Claims, No Drawings

INKJET INK COMPOSITION

CROSS REFERENCE TO RELATED PATENT APPLICATIONS

This is a non-provisional application of U.S. provisional application Ser. No. 60/170,555 filed Dec. 14, 1999.

This invention concerns polymeric binders which are suitable for use in ink jet inks. More specifically, this invention relates to polymeric binders formed by polymerization of a monomer mixture comprising a polymerizable surfactant monomer.

Certain ink jet inks comprise a liquid medium, a colorant, such as a pigment or dye, a binder or resin to aid in dispersing the pigment in the medium and to affix the colorant to the print surface. In order to create more durable print quality, particularly in terms of color-fastness and water- and rub-resistance of the printing ink, there has been interest in preparing ink jet inks in which the colorant is an insoluble pigment, rather than a water soluble dye. The latter are generally absorbed to some degree by the paper or other print medium, but due to their inherent water-solubility do not offer good waterfastness. Pigment-based inks are generally deposited on the surface of the print medium, making them susceptible to removal by water or abrasion. However, as a result of the physical properties of pigments, pigment based ink compositions have a tendency to have a low wet-rub resistance and low highlighter resistance.

The term "wet-rub," as used herein, means applying abrasive pressure across the printed substrate with a wetted paper facial tissue and measuring any smear created thereby; wet-rub differs from waterfastness because abrasion is used. The term "highlighter resistance," as used herein, means applying abrasive pressure across a printed substrate with a commercially available highlighting marker and measuring any smear created thereby; an example of such marker is Sanford Corp. Major Accent brand highlighting markers. The term "print quality", as used herein, means an accumulative evaluation of the overall performance of an ink jet ink as measured by the appearance of a printed page of combined text and graphics, including edge sharpness, bleed, feathering, optical density, wet-rub resistance, highlighter resistance and print operability. The term "print operability", as used herein, means an accumulative evaluation of printer performance, including print appearance and uniformity, page after page longevity of print quality and uniformity, nozzle drop outs, print head maintenance problems, and the ability to stop and restart printing.

Polymer binders have been added to ink jet ink compositions to improve durability, to improve print quality and to reduce color bleeding and feathering. However, the inclusion of such binders can result in increased printhead maintenance problems, including clogging of the nozzles and kogation, i.e. formation of film on or about the heater. Also, polymers may tend to form films on the nozzle plate. The addition of polymers to ink jet ink compositions also may cause decreased pigment dispersion stability and interference with bubble formation.

EP-A-0869 160 discloses an inkjet ink formulation with colorant, vehicle and resin emulsion containing ionic carboxylic groups on the surface of resin emulsion particles to cause disassociation of the colorant and resin particles. The resin has 1 to 40 wt. % "carboxylic acid groups", and Tg of 0 to 120° C. Exemplified embodiments of the resin include copolymers of butyl acrylate, methyl methacrylate and (meth)acrylic acid, with 3 to 20 wt. % acid, Tg of 53 to 95° C. and particle size of 63 to 235 nm, utilizing high Tgs and low particle sizes.

EP-A-0747456 discloses a method for providing a waterborne coating composition, such as a paint, having improved color acceptance. The coating composition contains an emulsion-polymerized addition polymer formed from a mixture of monomers including a polymerizable surfactant monomer. There is no disclosure of the use of the addition polymer in an ink.

It is an object of the present invention to provide a polymeric binder for use with a colorant to form an ink jet ink that demonstrates an improved print quality, as expressed by an improvement in one or more properties used to determine print quality, which improvement is achieved without any significant detrimental effect on the other properties used to determine print quality.

In accordance with the present invention, there is provided a polymeric binder suitable for use in an ink composition, preferably an ink jet ink composition, comprising a colorant and a polymeric binder, wherein the polymeric binder is an emulsion-polymerized addition copolymer formed from a monomer mixture comprising ethylenically unsaturated monomers including from more than 4 to 15 wt % based on the weight of said mixture of at least one ethylenically unsaturated carboxylic acid functional monomer, and from 0.05 to 5 wt % based on the weight of said mixture of at least one polymerizable surfactant monomer comprising hydrophobic and hydrophilic functional groups, wherein said hydrophilic functional group comprises a polymerizable group within it.

In another aspect, there is provided an ink composition, preferably an ink jet composition, comprising a colorant and a polymeric binder, wherein the polymeric binder is an emulsion-polymerized addition copolymer formed from a monomer mixture comprising ethylenically unsaturated monomers including from more than 4 to 15 wt % based on the weight of said mixture of at least one ethylenically unsaturated carboxylic acid functional monomer, and from 0.05 to 5 wt % based on the weight of said mixture of at least one polymerizable surfactant monomer comprising hydrophobic and hydrophilic functional groups, wherein said hydrophilic functional group comprises a polymerizable group within it.

In yet another aspect of the present invention, there is provided the use of an emulsion-polymerized addition copolymer, formed from a monomer mixture comprising ethylenically unsaturated monomers including from more than 4 to 15 wt % based on the weight of said mixture of at least one ethylenically unsaturated carboxylic acid functional monomer and from 0.05 to 5 wt % based on the weight of said mixture of at least one polymerizable surfactant monomer comprising hydrophobic and hydrophilic functional groups, wherein said hydrophilic functional group comprises a polymerizable group within it, as a polymeric binder in an ink composition, preferably an ink jet composition, to improve the print quality of said ink composition.

Surprisingly, ink jet inks comprising a binder of the present invention demonstrate improved print quality over binders of similar composition but which do not comprise a polymerized surfactant monomer. In addition, ink jet inks of the present invention may demonstrate an improved optical density. Polymerizable surfactant monomers are known in the art. They are surface active compounds having a polymerizable group, such as an allyl, acryl methacryl or methallyl group (also referred to herein as (meth)acryl and (meth)allyl), and which may be used as an emulsifier in an emulsion polymerization. Thus, the polymerizable surfactant functions as both a surfactant and as a comonomer. The polymerizable surfactant may be cationic, anionic or non-ionic. Suitable polymerizable surfactant monomers comprising hydrophobic and hydrophilic functional groups, wherein said hydrophilic functional group comprises a polymerizable group within it, include, for example, anionic surfactant monomers such as sulphates, phosphates, sulphosuccinate half esters, and sulphosuccinate diesters bearing copolymerizable reactive groups and nonionic surfactant monomers. Preferred polymerizable surfactant monomers comprising hydrophobic and hydrophilic functional groups, wherein said hydrophilic functional group comprises a polymerizable group within it are selected from the group of relevant monomers consisting of allylammonium $C_8$–$C_{22}$ alkyl-12EO-phosphate (for example as X-2263-26 from Stepan); allylammonium $C_{8-C22}$ alkyl-7EO-phosphate (for example as X-2263-27b from Stepan); allylammonium $C_8$–$C_{22}$ alkyl-3EO-phosphate (for example as X-2263 is 28b from Stepan); allylammonium linear-dodecyl benzene sulfonate (for example as AU-1 from Stepan); allylammonium lauryl-sulfate (for example as AU-5 from Stepan); and allyl ammonium alkylether-sulfate (for example as NMS-7 from Stepan). Suitable polymerizable surfactant monomers comprising hydrophobic and hydrophilic functional groups, wherein said hydrophilic functional group comprises a polymerizable group within it, also include, for example, acrylate ethoxylates as described in U.S. Pat. No. 5,162,475, diallylamine PO/EO copolymers (as described in U.S. Pat. No. 5,478,883), and maleate derivatives (as described in U.S. Pat. No. 4,246,387).

Preferably, the hydrophilic functional group comprises within it a polymerizable group which is an ethylenically unsaturated amine cation. Examples of suitable ethylenically unsaturated amine cations are the non-cyclic cations of Formulas I to III, the cyclic cations of Formulas IV to VIII and the non-cyclic butadiene, pentadiene, and hexadiene analog cations of Formulas IV to VIII:

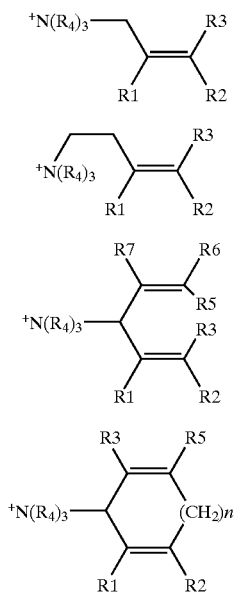

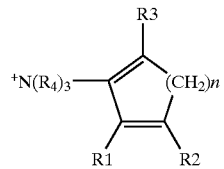

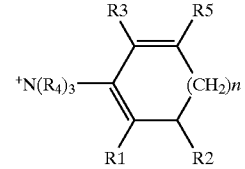

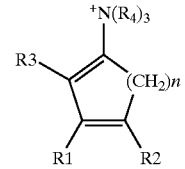

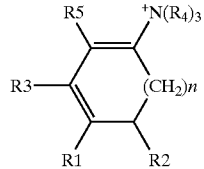

where n is in the range 0 to 8, each of $R_1$, $R_2$, $R_3$, $R_5$, $R_6$, and $R_7$ groups is independently selected from the group consisting of H, substituted or unsubstituted $C_1$–$C_8$ alkyl and substituted or unsubstituted $C_6$–$C_{12}$ aryl, and each $R_4$ is independently selected from the group consisting of H and substituted or unsubstituted $C_1$–$C_8$ alkyl. More preferably, the polymerizable group comprises a cation of Formula I. Examples of particular ethylenically unsaturated amine cations which may be suitable for use in the present invention include the following: 9H-Fluoren-9-amine; 3,4-dihydropyridine; 1,4 dihydro pyridine; 2,3,4,5-tetrahydro pyridine; 1,2,3,6,-tetrahydro pyridine; 3-pyrroline; 1,3-Butadien-1-amine; 5-amino-1,3-cyclopentadiene; 1,3-Cyclohexadiene-1-carboxylic acid, 5-amino-, methyl ester; 1,4-Cyclohexadiene-1-carboxylic acid, 3-amino-, methyl ester; Bicyclo [2.2.1]hept-2-en-7-amine; Bicyclo[2.2.1]hept-5-en-2-amine, 2-Norbornen-1-amine, 2-Bornanamine, and N,N-diethylaminoisoprene. In general, the ethylenically unsaturated amine cations, such as those of Formulas I to VIII, may be obtained from the group of ethylenically unsaturated allylic, benzylic, or dienyl amines or isomers of those amines. The polymerizable surfactant comprising such ethylenically unsaturated amine cations may be formed from the amine and any suitable long chain hydrophobic organic or inorganic acid such as dodecybenzenesulfonic acid, dodecanoic acid, and aromatic phosphonic acids.

The amount of polymerizable surfactant monomer in the monomer mix is preferably from 0.075 to 2 wt %, more preferably 0.075 to 0.5 wt %, based on the weight of said mixture.

The ethylenically unsaturated carboxylic acid functional monomers are preferably $C_3$ to $C_{20}$ ethylenically unsaturated carboxylic acids, more preferably monomers selected from the group consisting of acrylic acid, methacrylic acid, itaconic acid, fumaric acid, maleic acid and anhydrides of such acids; their basic salts e.g. the ammonium, lithium, sodium and potassium salts thereof; and mixtures of such monomers. Alternatively, the ethylenically unsaturated carboxylic acid monomer may be an oligomer of acrylic or methacrylic acid, preferably having a molecular weight of no more than 5000 Daltons.

The amount of ethylenically unsaturated carboxylic acid monomer in the monomer mix is preferably from more than 4 to 10 wt %, more preferably from 4.5 to 9 wt %, based on the weight of said mixture.

Other ethylenically unsaturated monomers suitable for use in said monomer mix include one or more monomers selected from, but not limited to: substituted e.g. hydroxy- or acetoacetoxy-substituted and unsubstituted ($C_1$ to $C_{50}$, preferably $C_1$–$C_{22}$, most preferably $C_1$ to $C_{18}$) alkyl (meth) acrylates, styrene and substituted styrenes, vinyl acrylates, vinyl acetates, fluoromethacrylates, acrylamide, substituted acrylamides, methacrylamides, substituted methacrylamides, and combinations thereof. Among the esters of acrylic acid and methacrylic acid, preferred monomers include methyl acrylate, ethyl acrylate, propyl acrylate, butyl acrylate, ethylhexyl acrylate, lauryl acrylate, methyl methacrylate, ethyl methacrylate, propyl methacrylate, butyl methacrylate, lauryl methacrylate, isobutylene methacrylate, styrene, acrylamide, vinyl acrylate, vinyl acetate, hydroxyethyl acrylate and hydroxyethyl methacrylate.

In one embodiment, the binder comprises an addition copolymer of ethylhexyl acrylate, methyl methacrylate, methacrylic acid and allyl ammonium dodecyl benzene sulfonate.

Preferably the binder comprises an addition polymer with a glass transition temperature, Tg, of at least −40° C., more preferably in the range from −35 to about 120° C., yet more preferably in the range from −35 to 20° C., and even more preferably in the range from −30 to 10° C. Tg can be determined by the Fox equation.

In a preferred embodiment, the polymer binder comprises a single stage addition polymer with an average diameter in the range from about 100 to 400 nm. More preferably, the average diameter is in the range 200 to 350 nm. The average particle diameter may be determined by a light scattering technique, such as by employing a Brookhaven Instruments Corporation, "BI-90 Particle Sizer" analyzer.

The particle size distribution of the binder polymer may be unimodal, bimodal or polymodal, but modality is not considered important to the practice of this invention.

The molecular weight of the polymeric binder is not critical. However, it has been found that the binder polymers preferably has a molecular weight in the range from about 10,000 to about 2,000,000 Daltons; more preferably, 50,000 to 1,000,000 Daltons. The molecular weight as used herein is defined as the weight average molecular weight and may be determined by gel permeation chromatography in THF as solvent.

The ink composition of the present invention may further comprise additional components including without limitation process aids such as other (free) surfactants, protective colloids, and other stabilizers known to those skilled in the art. Suitable surfactants, for example, include sodium lauryl sulfate, sodium dodecylbenzene sulfonate, sodium dioctyl sulfosuccinate, and ammonium perfluroralkyl sulfonates, Triton X-100, Triton X-405, and polyoxyethylenated polyoxypropylene glycols.

The addition polymer may be prepared by a conventional persulfate-initiated thermal process known in the art such as batch, semi-batch, gradual addition or continuous, for example as described in EP-A-0747456. The monomers are polymerized to preferably greater than 99% conversion and then the reaction is cooled to room temperature (20–25° C.) after the addition of the appropriate amount of neutralizing base to control pH. The pH is adjusted to between pH 7–10, more preferably between pH 8–9, with neutralizer such as, for example, ammonia, lithium hydroxide, sodium hydroxide, potassium hydroxide or combinations of these neutralizers.

The binder may be incorporated in an ink composition, preferably an ink jet ink composition, comprising, for example, pigment, binder and an aqueous medium. Preferably, the binder is present at a level of 0.1 to 10 weight percent, preferably, 0.5 to 8 weight percent, more preferably 1 to 5 weight percent relative to the total weight of the ink composition. The aqueous carrier may be water; preferably, deionized water. In one embodiment, the aqueous carrier is present at from about 40% to about 95%, preferably from about 55% to about 80%, most preferably, from about 70% to about 80% by weight of the ink composition. Selection of a suitable mixture for the ink composition using the binder of the present invention depends upon the requirements of the specific ink being formulated, such as the desired surface tension and viscosity, the pigment used, the drying time required for the pigmented ink and the type of paper onto which the ink will be printed.

The ink composition using the binder of the present invention may also include water miscible materials such as humectants, dispersants, penetrants, chelating agents, co-solvents, defoamers, buffers, biocides, fungicides, viscosity modifiers, bactericides, surfactants, anti-curling agents, anti-bleed agents and surface tension modifiers, all as is known in the art. Useful humectants include ethylene glycol, 1,3 propanediol, 1,4 butanediol, 1.4 cyclohexanedimethanol, 1,5 pentanediol, 1,6 hexanediol, 1,8 octanediol, 1,2 propanediol, 1,2 butanediol, 1,3 butanediol, 2,3 butanediol, diethylene glycol, triethylene glycol, tetraethylene glycol, polyethylene glycol with average molecular weight of 200, 300, 400, 600, 900, 1000, 1500 and 2000, dipropylene glycol, polyproylene glycol with average molecular weight of 425, 725, 1000, and 2000, 2-pyrrolidone, 1-methyl-2-pyrrolidone, 1-methyl-2-piperidone, N-ethylacetamide, N-methlpropionamide, N-acetyl ethanolamine, N-methylacetamide, formamide, 3-amino-1,2-propanediol, 2,2-thiodiethanol, 3,3-thiodipropanol, tetramethylene sulfone, butadiene sulfone, ethylene carbonate, butyrolacetone, tetrahydrofurfuryl alcohol, glycerol, 1,2,4-butenetriol, trimethylpropane, pantothenol, Liponic EG-1. Preferred humectants are polyethylene glycol with average molecular weight of 400 to 1000, 2-pyrrolidone 2,2 thiodiethanol, and 1,5 pentanediol. Preferred penetrants include n-propanol, isopropyl alcohol, 1,2 hexanediol, and hexyl carbitol.

Examples of colorants useful in the method of the present invention are selected from the group of pigments and dyes generally useful in ink jet printing. Suitable organic pigments include carbon black, azo compounds, phthalocyanine pigments, quinacridone pigments, anthraquinone pigments, dioxazine pigments, indigo, thioindigo pigments, perynone pigments, perylene pigments, and isoindolene. Suitable inorganic pigments include titanium dioxide, iron oxide, and other metal powders. The amount of pigment is generally determined by the desired properties of the ink to be made. Generally, the amount of pigments used is less that 10% and is typically from 3–8% by weight based on the total weight of all the components of the ink. The pigment particle size must be sufficiently small that pigment particles will not clog the nozzles on the printing device in which the ink is to be used. Typical nozzle openings on thermal ink jet printers are 30–60 microns in diameter. Preferably, the pigment particle size is from 0.05 to 2 microns, more preferably not more than one micron and most preferably not more than 0.3 microns.

The amount of humectant used is determined by the properties of the ink and may range from 1–30%, preferably from 5–15% by weight, based on the total weight of all the components in the ink. Examples of commonly used humectants useful in forming the ink are: glycols, polyethylene glycols, glycerol, ethanolamine, diethanolamine, alcohols, and pyrrolidones. Other humectants known in the art may be used as well.

The use of suitable penetrants will depend on the specific application of the ink. Useful examples include pyrrolidone, and N-methyl-2-pyrrolidone.

The amount of defoaming agent in the ink, if used, will typically range from 0.05–0.5% by weight, and is more typically 0.1 wt. %. The amount required depends on the process used in making the pigment dispersion component of the ink. Defoaming agents useful in forming aqueous dispersions of pigments are well known in the art and commercially available examples include Surfynol 104H and Surfynol DF-37 (Air Products, Allentown, Pa.).

The remaining portion of the ink is generally water. The amount of water preferably is from 65–90% by weight, more preferably from 75–85% by weight, based on the total weight of all the components in the ink.

The ink compositions of the present invention may be prepared by any method known in the art for making such compositions, for example, by mixing, stirring or agitating the ingredients together using any art recognized technique to form an aqueous ink. The procedure for preparation of the ink composition of the present invention is not critical except to the extent that the ink composition is homogenous.

One method for preparation is as follows: Mix the aqueous carrier, humectant(s), surfactant(s) and penetrant(s) for 10 minutes, or until homogenous. Prepare pigment-dispersant mixture by milling a 5 to 1 ratio of pigment to dispersant to a total of 20% solids in water. Slowly add aqueous carrier/humectant/surfactant/penetrant solution to pigment-dispersant while pigment(s) remains stirring. Let stir for another 10 minutes, or until homogeneous. Slowly add the pigment dispersion/carrier/humectant/surfactant to the polymeric binder with stirring. Continue to stir for 10 minutes or until homogenous. Adjust pH of the resultant ink to 8.2–8.5 (e.g. by adding sufficient 20% $NH_4OH$). Filter through a 1 micrometer filter.

It is expected that the ink compositions using the binders of the present invention would include any additives necessary to obtain the desired physical properties required for the end use of the ink composition such additives include chelating agents, buffers, biocides, fungicides, antioxidants, rheology modifiers, thickeners, bacteriocides, surfactants, anti-curling agents, anti-bleed agents and surface tension modifiers, all as discussed above.

The invention in some of its embodiments will now be further described by reference to the following examples:

EXAMPLES

The experiments described below are intended to show the effect of using a polymeric binder comprising a polymerized surfactant monomer in an ink jet ink to improve its print quality. Polymeric binders of the present invention comprise a polymerized surfactant monomer comprising hydrophobic and hydrophilic functional groups, wherein said hydrophilic functional group comprises a polymerizable group within it, and are identified in the worked examples with an asterisk. In each case, the polymeric binder was formulated into an in jet ink of Formulation 1 or Formulation 2 and the ink was applied to a paper (Hewlett Packard Bright White Ink Jet Paper) substrate.

|  | Weight |
|---|---|
| Ink Jet Ink Formulation 1 | |
| n-MethylPyrollidone | 6.5 g |
| PolyEthyleneGlycol | 4.0 g |
| Dispersion | 25.0 g |
| Propanediol | 10.2 g |
| Polymer Binder | 20.0 g |
| Water | 54.3 g |
| Total | 120.0 g |
| Ink Jet Ink Formulation 2 | |
| n-MethylPyrollidone | 6.4 g |
| PolyEthyleneGlycol | 4.0 g |
| Dispersion | 24.8 g |
| Propanediol | 4.8 g |
| Liponics EG-1 | 2.0 g |
| Surfynol 104E | 0.4 g |
| Polymer Binder | 20.0 g |
| Water | 57.6 g |
| Total | 120.0 g |

Liponics EG-1 is a dispersant available from Lipo Chemicals, N.J. Surfynol 104E is a dispersant available from Air Products, PA.

Several different ink jet printers were used. These include the Hewlett Packard DeskJet 540, 690C, and 890C printers. All of these are thermal (bubble jet) drop on demand type printers. Print samples were allowed to dry for at least one hour before evaluation or the drying was accelerated by oven drying for 10 minutes at 85° C.

After application, the print was evaluated as follows:

Optical density (OD) was measured on a Macbeth 1200 Color Checker. Wet rub resistance (WR) was measured by wiping a wetted Kleenex facial tissue across a 2.5 cm block of solid, filled print area. The resistance to smudging was rated on a 1 to 5 scale where 5 indicates no smudging and 1 indicated smudging equal to the pigmented Hewlett Packard ink sold for that specific printer.

Highlighter resistance was rated by using commercially available acidic and alkaline highlighters to highlight a printed text area. The rating indicates the number of times the highlighter was wiped over the same text area before significant smudging was noted. A maximum of ten highlighter wipes were tried on a sample. Responses of 10 can be interpreted as 10 or greater.

Print quality was rated by judging the appearance of a printed page of combined text and graphics. Edge sharpness, bleed, feathering, wet-rub resistance, highlighter resistance and print operability were accumulated into this evaluation. The scale is the linear combination of 3 times the optical density, the highlighter performance, the wet rub performance and the print operability rating.

Print operability was rated by judging the printer performance. Print appearance and uniformity, page after page longevity of print quality and uniformity, nozzle drop outs, print head maintenance problems and the ability to stop and restart were accumulated into this evaluation. The scale ranges from 0 to 5 where 0 was inoperable, 1 was poor and 5 was excellent.

EXAMPLE 1

An addition polymer was prepared in accordance with the following general procedure:

A three liter flask was charged with 960 g of deionized water, placed under a nitrogen atmosphere, and heated to 85° C. A monomer emulsion consisting of 275 g 2-ethylhexyl acrylate (52 parts), 227 g methyl methacrylate (43 parts), 27 g methacrylic acid (5 parts), 1.5 g of TREM LF-40 solution (36%, Henkel Corp.), and 177 g deionized water was separately prepared. Prior to addition of this emulsion to the kettle, ammonia (24 g of a 4.8%–9.6% aqueous solution), ammonium persulfate (11 g of a 9.6% solution), and a 54 nm acrylic polymer seed (22.5 g of a 22.8% solution) were added to the kettle. The monomer emulsion was then fed to the kettle with stirring at a rate of 3.9 g/min. for 20 min. along with a solution of 24.6 g of 2.24% aqueous ammonium persulfate at a rate of 0.2 g/min., followed by 100 minutes at 6.4 and 0.20 g/min., respectively, and a hold period of 20 min. The mixture was then cooled to 60° C., and a mixture of 2.6 g of 0.15% ferrous sulfate followed by 3.2 g of 4.4% t-butyl hydroperoxide and 6.1 g of 1.6% sodium formaldehyde sulfoxylate was added and held for 20 min., followed by a second identical portion of tBHP and SFS. The mixture was then cooled, filtered, and sufficient 29% aqueous ammonia was added to adjust the pH to a range of 8.0–9.0 (final polymer binder=30% by weight polymer solids, average diameter 270 nm, Tg=–20° C., and pH 8.2).

EXAMPLES 2 TO 53

The procedure recited above was repeated except that the monomer emulsion was adjusted as indicated below:

EXAMPLE 2 (COMPARATIVE)

52 parts by weight ethylhexyl acrylate, 43 parts by weight methylmethacrylate, and 5 parts by weight methacrylic acid in the presence of 0.1 parts hydroxyethylcellulose (final polymer binder=30% by weight polymer solids, average diameter 380 nm, Tg=–20° C., and pH 8.1);

EXAMPLE 3 (COMPARATIVE)

52 parts by weight ethylhexyl acrylate, 43 parts by weight methylmethacrylate, and 5 parts by weight methacrylic acid in the presence of 0.1 parts polyvinyl alcohol (final polymer binder=30% by weight polymer solids, average diameter 597 nm, Tg=–20° C., and pH 8.1);

EXAMPLE 4 (COMPARATIVE)

45.6 parts by weight butylacrylate, 52.4 parts by weight methylmethacrylate, 1 part by weight adhesion promoter, and 1 part by weight methacrylic acid was polymerized in the presence of 0.5 parts sodium lauryl sulfate (final polymer binder=30% by weight polymer solids, average diameter 120 nm, Tg=–20° C., and pH 8.1);

EXAMPLE 5 (COMPARATIVE)

19 parts by weight butylacrylate, 80 parts by weight vinyl acetate, and 0.6 parts by weight hydroxyethyl cellulose, was polymerized in the presence of 1.5 parts mixed anionic and non-ionic non-polymerizable surfactants[(final polymer binder=30% by weight polymer solids, average diameter 220 nm, Tg=–20° C., and pH 8.1);

EXAMPLE 6 (COMPARATIVE)

52 parts by weight ethylhexyl acrylate, 43 parts by weight methylmethacrylate, and 5 parts by weight methacrylic acid in the presence of 0.1 parts by weight sodium lauryl sulphate (final polymer binder= 30% by weight polymer solids, average diameter 265 nm, Tg=–20° C., and pH 8.1);

EXAMPLE 7 (COMPARATIVE)

52 parts by weight ethylhexyl acrylate, 43 parts by weight methylmethacrylate, and 5 parts by weight methacrylic acid in the presence of 0.1 parts by weight sodium lauryl sulphate (final polymer binder= 30% by weight polymer solids, average diameter 265 nm, Tg=–20° C., and pH 8.1).

EXAMPLE 8

52 parts by weight ethylhexyl acrylate, 47 parts by weight methylmethacrylate, and 1 parts by weight methacrylic acid in the presence of 0.1 parts by weight TREM LF-40 (final polymer binder=29% by weight polymer solids, average diameter 270 nm, Tg=–20° C., and pH 9.4).

EXAMPLE 9

52 parts by weight ethylhexyl acrylate, 45.5 parts by weight methylmethacrylate, and 2.5 parts by weight methacrylic acid in the presence of 0.1 parts by weight TREM LF-40 (final polymer binder=29% by weight polymer solids, average diameter 261 nm, Tg=–20° C., and pH 9.4).

EXAMPLE 10

52 parts by weight ethylhexyl acrylate, 44 parts by weight methylmethacrylate, and 4.0 parts by weight methacrylic acid in the presence of 0.1 parts by weight TREM LF-40 (final polymer binder=29% by weight polymer solids, average diameter 254 nm, Tg=–20° C., and pH 9.3).

EXAMPLE 11

52 parts by weight ethylhexyl acrylate, 43 parts by weight methylmethacrylate, and 5.0 parts by weight methacrylic acid in the presence of 0.1 parts by weight TREM LF-40 (final polymer binder=30% by weight polymer solids, average diameter 270 nm, Tg=–20° C., and pH 8.2).

EXAMPLE 12

52 parts by weight ethylhexyl acrylate, 41 parts by weight methylmethacrylate, and 7.0 parts by weight methacrylic acid in the presence of 0.1 parts by weight TREM LF-40 (final polymer binder=29% by weight polymer solids, average diameter 269 nm, Tg=–20° C., and pH 8.0).

EXAMPLE 13

52 parts by weight ethylhexyl acrylate, 39 parts by weight methylmethacrylate, and 9.0 parts by weight methacrylic acid in the presence of 0.1 parts by weight TREM LF-40

(final polymer binder=29% by weight polymer solids, average diameter 261 nm, Tg=−20° C., and pH 9.4).

EXAMPLE 14

52 parts by weight ethylhexyl acrylate, 43 parts by weight methylmethacrylate, and 5 parts by weight methacrylic acid in the presence of 0.1 parts by weight TREM LF-40 (final polymer binder=30% by weight polymer solids, average diameter 270 nm, Tg=−20° C., and pH 8.2).

EXAMPLE 15

52 parts by weight ethylhexyl acrylate, 43 parts by weight methylmethacrylate, and 5 parts by weight methacrylic acid in the presence of 0.2 parts by weight TREM LF-40 (final polymer binder=29% by weight polymer solids, average diameter 255 nm, Tg=−20° C., and pH 8.0).

EXAMPLE 16*

52 parts by weight ethylhexyl acrylate, 43 parts by weight methylmethacrylate, and 5 parts by weight methacrylic acid in the presence of 0.1 parts by weight allylammonium Lauryl-12EO-phosphate (Stepan X-2263-26; final polymer binder=29% by weight polymer solids, average diameter 271 nm, Tg=−20° C., and pH 8.3).

EXAMPLE 17*

52 parts by weight ethylhexyl acrylate, 43 parts by weight methylmethacrylate, and 5 parts by weight methacrylic acid in the presence of 0.2 parts by weight allylammonium Lauryl-7EO-phosphate (Stepan X-2263-27b; final polymer binder=30% by weight polymer solids, average diameter 270 nm, Tg=−20° C., and pH 9.0).

EXAMPLE 18*

52 parts by weight ethylhexyl acrylate, 43 parts by weight methylmethacrylate, and 5 parts by weight methacrylic acid in the presence of 0.1 parts by weight allylammonium Lauryl-3EO-phosphate (Stepan X-2263-28b; final polymer binder=29% by weight polymer solids, average diameter 268 nm, Tg=−20° C., and pH 8.7).

EXAMPLE 19*

52 parts by weight ethylhexyl acrylate, 43 parts by weight methylmethacrylate, and 5 parts by weight methacrylic acid in the presence of 0.2 parts by weight allylammonium linear-dodecyl benzene sulfonate (Stepan AU-1; final polymer binder=29% by weight polymer solids, average diameter 258 nm, Tg=−20° C., and pH 9.0).

EXAMPLE 20*

52 parts by weight ethylhexyl acrylate, 43 parts by weight methylmethacrylate, and 5 parts by weight methacrylic acid in the presence of 0.2 parts by weight allylammonium lauryl-sulfate (Stepan AU-5; final polymer binder=29% by weight polymer solids, average diameter 245 nm, Tg=−20° C., and pH 9.0).

EXAMPLE 21*

52 parts by weight ethylhexyl acrylate, 43 parts by weight methylmethacrylate, and 5 parts by weight methacrylic acid in the presence of 0.2 parts by weight allyl ammonium alkylether-sulfate (Stepan NMS-7; final polymer binder=29% by weight polymer solids, average diameter 265 nm, Tg=−20° C., and pH 9.0).

EXAMPLE 22

52 parts by weight ethylhexyl acrylate, 43 parts by weight methylmethacrylate, and 5 parts by weight methacrylic acid in the presence of 0.2 parts by weight ammonium Di-(tricyclo(5.2.1.0 2,6) dec-3-en-(8 or 9)oxyethyl) sulfosuccinate; final polymer binder=29% by weight polymer solids, average diameter 270 nm, Tg=−20° C., and pH 8.6).

EXAMPLE 23

52 parts by weight ethylhexyl acrylate, 43 parts by weight methylmethacrylate, and 5 parts by weight methacrylic acid in the presence of 0.2 parts by weight ammonium Di-(tricyclo(5.2.1.0 2,6) dec-3-en-(8 or 9) sulfosuccinate; final polymer binder=28% by weight polymer solids, average diameter 270 nm, Tg=−20° C., and pH 8.8).

EXAMPLE 24

52 parts by weight ethylhexyl acrylate, 45.5 parts by weight methylmethacrylate, and 2.5 parts by weight methacrylic acid in the presence of 0.1 parts by weight TREM LF-40, and 35 g of 29% polymeric seed particles of 54 nm size (final polymer binder=29% by weight polymer solids, average diameter 217 nm, Tg=−20° C., and pH 9.2).

EXAMPLE 25

52 parts by weight ethylhexyl acrylate, 45.5 parts by weight methylmethacrylate, and 2.5 parts by weight methacrylic acid in the presence of 0.1 parts by weight TREM LF-40, and 23.5 g of 23% polymeric seed particles of 54 nm size (final polymer binder=29% by weight polymer solids, average diameter 261 nm, Tg=−20° C., and pH 9.4).

EXAMPLE 26

52 parts by weight ethylhexyl acrylate, 45.5 parts by weight methylmethacrylate, and 2.5 parts by weight methacrylic acid in the presence of 0.1 parts by weight TREM LF-40, and 47.3 g of 35% polymeric seed particles of 95 nm size (final polymer binder=28% by weight polymer solids, average diameter 280 nm, Tg=−20° C., and pH 8.6).

EXAMPLE 27

52 parts by weight ethylhexyl acrylate, 45.5 parts by weight methylmethacrylate, and 2.5 parts by weight methacrylic acid in the presence of 0.1 parts by weight TREM LF-40, and 33.5 g of 32% polymeric seed particles of 95 nm size (final polymer binder=29% by weight polymer solids, average diameter 323 nm, Tg=−20° C., and pH 9.2).

EXAMPLE 28

In a similar manner to example 1 except 59 parts by weight ethylhexyl acrylate, 36 parts by weight methylmethacrylate, and 5 parts by weight methacrylic acid in the presence of 0.2 parts by weight TREM LF-40, (final polymer binder=29% by weight polymer solids, average diameter 262 nm, Tg=−31° C., and pH 9.0).

EXAMPLE 29

In a similar manner to example 28 with 52 parts by weight ethylhexyl acrylate, 43 parts by weight methylmethacrylate, and 5 parts by weight methacrylic acid in the presence of 0.2 parts by weight TREM LF-40, (final polymer binder=29% by weight polymer solids, average diameter 263 nm, Tg=−20° C., and pH 9.0).

EXAMPLE 30

In a similar manner to example 28 with 45 parts by weight ethylhexyl acrylate, 50 parts by weight methylmethacrylate, and 5 parts by weight methacrylic acid in the presence of 0.2 parts by weight TREM LF-40, (final polymer binder=29% by weight polymer solids, average diameter 271 nm, Tg=−6° C., and pH 8.0).

EXAMPLE 31

In a similar manner to example 28 with 40 parts by weight ethylhexyl acrylate, 55 parts by weight methylmethacrylate, and 5 parts by weight methacrylic acid in the presence of 0.2 parts by weight TREM LF-40, (final polymer binder=29% by weight polymer solids, average diameter 263 nm, Tg=0° C., and pH 8.4).

EXAMPLE 32

In a similar manner to example 28 with 30 parts by weight ethylhexyl acrylate, 65 parts by weight methylmethacrylate, and 5 parts by weight methacrylic acid in the presence of 0.2 parts by weight TREM LF-40, (final polymer binder=30% by weight polymer solids, average diameter 276 nm, Tg=+20° C., and pH 8.8).

EXAMPLE 33

In a similar manner to example 28 with 18 parts by weight ethylhexyl acrylate, 77 parts by weight methylmethacrylate, and 5 parts by weight methacrylic acid in the presence of 0.2 parts by weight TREM LF-40, (final polymer binder=30% by weight polymer solids, average diameter 289 nm, Tg=+40° C., and pH 8.8).

EXAMPLE 34

In a similar manner to example 28 with 8 parts by weight ethylhexyl acrylate, 87 parts by weight methylmethacrylate, and 5 parts by weight methacrylic acid in the presence of 0.2 parts by weight TREM LF-40, (final polymer binder=30% by weight polymer solids, average diameter 261 nm, Tg=+60° C., and pH 8.8).

EXAMPLE 35

In a similar manner to example 29 with 52 parts by weight ethylhexyl acrylate, 43 parts by weight methylmethacrylate, and 5 parts by weight methacrylic acid in the presence of 0.1 parts by weight TREM LF-40, (final polymer binder=30% by weight polymer solids, average diameter 270 nm, Tg=−20° C., and pH 8.2).

EXAMPLE 36*

In a similar manner to example 29 with 52 parts by weight ethylhexyl acrylate, 43 parts by weight methylmethacrylate, and 5 parts by weight acrylic acid in the presence of 0.2 parts by weight Stepan AU-1 (final polymer binder=29% by weight polymer solids, average diameter 296 nm, Tg=−20° C., and pH 8.0).
261 nm, Tg=+60° C., and pH 8.8).

EXAMPLE 37

In a similar manner to example 29 with 52 parts by weight ethylhexyl acrylate, 43 parts by weight methylmethacrylate, and 5 parts by weight oligomeric acrylic acid (Mw=1400, prepared according to the process disclosed in U.S. Pat. No. 5,710,227 in the presence of 0.1 parts by weight TREM LF-40, (final polymer binder=28% by weight polymer solids, average diameter 261 nm, Tg=−20° C., and pH 9.2).
261 nm, Tg=+60° C., and pH 8.8).

EXAMPLE 38*

In a similar manner to example 29 with 52 parts by weight ethylhexyl acrylate, 43.5 parts by weight methylmethacrylate, 3.0 parts by weight acrylic acid, and 1.5 parts by weight itaconic acid in the presence of 0.2 parts by weight Stepan AU-1 (final polymer binder=30% by weight polymer solids, average diameter 276 nm, Tg=−20° C., and pH 8.5).

EXAMPLE 39*

In a similar manner to example 29 with 52 parts by weight ethylhexyl acrylate, 43.5 parts by weight methylmethacrylate, and 5 parts by weight itaconic acid in the presence of 0.2 parts by weight Stepan AU-1 (final polymer binder=29% by weight polymer solids, average diameter 264 nm, Tg=−20° C., and pH 8.6).

EXAMPLE 40

In a similar manner to example 14 with 52 parts by weight ethylhexyl acrylate, 43 parts by weight methylmethacrylate, and 5.0 parts by weight methacrylic acid in the presence of 0.2 parts by weight TREM LF-40 (final polymer binder=30% by weight polymer solids, average diameter 270 nm, Tg=−20° C., and pH 8.2).

EXAMPLE 41*

In a similar manner to example 14 with 52 parts by weight ethylhexyl acrylate, 43 parts by weight methylmethacrylate, and 5.0 parts by weight methacrylic acid in the presence of 0.1 parts by weight Stepan AU-1 (final polymer binder=29% by weight polymer solids, average diameter 270 nm, Tg=−20° C., and pH 9.6).

EXAMPLE 42*

In a similar manner to example 41 with 52 parts by weight ethylhexyl acrylate, 42 parts by weight methylmethacrylate, 5.0 parts by weight methacrylic acid, and 1 part by weight 2-hydroxyethyl methacrylate (HEMA) in the presence of 0.2 parts by weight Stepan AU-1 (final polymer binder=29% by weight polymer solids, average diameter 254 nm, Tg=−20° C., and pH 9.0).

EXAMPLE 43*

In a similar manner to example 42 with 52 parts by weight ethylhexyl acrylate, 41 parts by weight methylmethacrylate, 5.0 parts by weight methacrylic acid, and 2 parts by weight 2-hydroxyethyl methacrylate (HEMA) in the presence of 0.2 parts by weight Stepan AU-1 (final polymer binder=29% by weight polymer solids, average diameter 272 nm, Tg=−20° C., and pH 9.2).

EXAMPLE 44*

In a similar manner to example 42 with 52 parts by weight ethylhexyl acrylate, 39 parts by weight methylmethacrylate, 5.0 parts by weight methacrylic acid, and 4 parts by weight 2-hydroxyethyl methacrylate (HEMA) in the presence of 0.2 parts by weight Stepan AU-1 (final polymer binder=30% by weight polymer solids, average diameter 275 nm, Tg=−20° C., and pH 9.0).

EXAMPLE 45*

In a similar manner to example 42 with 52 parts by weight ethylhexyl acrylate, 35 parts by weight methylmethacrylate, 5.0 parts by weight methacrylic acid, and 8 parts by weight 2-hydroxyethyl methacrylate (HEMA) in the presence of 0.2 parts by weight Stepan AU-1 (final polymer binder=29% by weight polymer solids, average diameter 250 nm, Tg=−20° C., and pH 8.9).

EXAMPLE 46*

In a similar manner to example 42 with 52 parts by weight ethylhexyl acrylate, 42 parts by weight methylmethacrylate, 5.0 parts by weight methacrylic acid, and 1 part by weight 2-hydroxyethyl acrylate (HEA) in the presence of 0.2 parts by weight Stepan AU-1 (final polymer binder=29% by weight polymer solids, average diameter 266 nm, Tg=−20° C., and pH 9.0).

EXAMPLE 47*

In a similar manner to example 46 with 52 parts by weight ethylhexyl acrylate, 41 parts by weight methylmethacrylate, 5.0 parts by weight methacrylic acid, and 2 parts by weight 2-hydroxyethyl acrylate (HEA) in the presence of 0.2 parts by weight Stepan AU-1 (final polymer binder=29% by weight polymer solids, average diameter 274 nm, Tg=−20° C., and pH 8.7).

EXAMPLE 47*

In a similar manner to example 46 with 52 parts by weight ethylhexyl acrylate, 41 parts by weight methylmethacrylate, 5.0 parts by weight methacrylic acid, and 2 parts by weight 2-hydroxyethyl acrylate (HEA) in the presence of 0.2 parts by weight Stepan AU-1 (final polymer binder=29% by weight polymer solids, average diameter 274 nm, Tg=−20° C., and pH 8.7).

EXAMPLE 48*

In a similar manner to example 46 with 52 parts by weight ethylhexyl acrylate, 39 parts by weight methylmethacrylate, 5.0 parts by weight methacrylic acid, and 4 parts by weight 2-hydroxyethyl acrylate (HEA) in the presence of 0.2 parts by weight Stepan AU-1 (final polymer binder=29% by weight polymer solids, average diameter 258 nm, Tg=−20° C., and pH 8.7).

EXAMPLE 49*

In a similar manner to example 46 with 52 parts by weight ethylhexyl acrylate, 35 parts by weight methylmethacrylate, 5.0 parts by weight methacrylic acid, and 8 parts by weight 2-hydroxyethyl acrylate (HEA) in the presence of 0.2 parts by weight Stepan AU-1 (final polymer binder=29% by weight polymer solids, average diameter 225 nm, Tg=−20° C., and pH 8.3).

EXAMPLE 50

In a similar manner to example 14 with 52 parts by weight ethylhexyl acrylate, 43 parts by weight methylmethacrylate, and 5.0 parts by weight methacrylic acid in the presence of 0.1 parts by weight TREM LF-40 (final polymer binder=30% by weight polymer solids, average diameter 270 nm, Tg=−20° C., and pH 8.2). This sample was used as is.

EXAMPLE 51

In a similar manner to example 14 with 52 parts by weight ethylhexyl acrylate, 43 parts by weight methylmethacrylate, and 5.0 parts by weight methacrylic acid in the presence of 0.1 parts by weight TREM LF-40 (final polymer binder=30% by weight polymer solids, average diameter 270 nm, Tg=−20° C., and pH 8.2). To a portion of this emulsion was post-added 1 equivalent weight of LiOH, and the NH3 liberated was allowed to dissipate under enclosed air flow.

EXAMPLE 52

To a portion of example 50 emulsion was post-added 1 equivalent weight of KOH, and the NH3 liberated was allowed to dissipate under enclosed air flow.

EXAMPLE 53

To a portion of example 50 emulsion was post-added 1 equivalent weight of NaOH, and the NH3 liberated was allowed to dissipate under enclosed air flow.

Evaluation 1

This series of evaluations was prepared to demonstrate the improved print quality achieved when ink jet inks of the present invention are compared against ink jet inks comprising binders containing no polymerized surfactant monomer. The results are presented in Table 1.

From Table 1, it may be seen that the use of the polymerizable surfactant, Trem LF-40, in Polymer Binder of Example 1 gave a remarkable improvement in print quality than any of the other comparative systems. It is important to note that the non-polymerizable surfactant system used in Polymer Binder of Example 8 yielded poor print quality. It is also interesting to note that the optical density (OD) for the Polymer Binder of Example 1 was the best of the series as well.

Evaluation 2

This series of evaluations was prepared to demonstrate the effect of varying the acid level in the polymer binder of the present invention. The results are presented in Table 2.

The results in Table 2 indicate that OD, HR, and WR continue to improve as the acid level was increased, the print operability was poorer at 9% than at 5 or 7% MAA. While higher levels may be usable, especially with other acid monomers, we found the 5 to 7% level to be optimum for the overall balance of properties.

TABLE 1

5% MAA, 250 nm, Tg = −20

|  | Stabilization | Inkjet Formulation | Print Quality | Optical Density | Highlighter Resistance | Wet Rub | Print Operability | HP Printer |
|---|---|---|---|---|---|---|---|---|
| Example 1 | TREM | 1 | 3.9 | 1.18 | 3 | 3 | 3 | 540 |
| Example 2 | HEC | 1 | 2.8 | 1.11 | 3 | 3 | 2 | 540 |
| Example 3 | PVOH | 1 | 0 | NA | NA | NA | 0 | 540 |
| Example 4 | SLS | 1 | 0 | NA | NA | NA | 0 | 540 |
| Example 5 | PVOH | 1 | 0 | NA | NA | NA | 0 | 540 |
| Example 6 | SLS | 1/2 | 2.8 | 1.12 | 3 | 3 | 3 | 540/690C |
| Example 7 | SLS | 1/2 | 2.8 | 1.13 | 3 | 3 | 3 | 540/690C |

TABLE 2

0.1% TREM LF-40, 250 nm, Tg = −20

|  | Acid/% | Inkjet Formulation | Print Quality | Optical Density | Highlighter Resistance | Wet Rub | Long Term Printability (# of prints) | Print Operability | HP Printer |
|---|---|---|---|---|---|---|---|---|---|
| Example 8 | MAA 1% | 2 | 3.6 | 1.40 | 8 | 2 | NA | 0 | 690C |
| Example 9 | 2.5 | 2 | 4.0 | 1.36 | 8 | 3 | NA | 1 | 690C |
| Example 10 | 4.0 | 2 | 3.8 | 1.38 | 8 | 2 | NA | 1 | 690C |
| Example 11 | 5.0 | 2 | 5.3 | 1.39 | 10 | 3 | 1000+ | 4 | 690C/890C |
| Example 12 | 7.0 | 2 | 4.8 | 1.44 | 9 | 3 | 500 | 3 | 690C/890C |
| Example 13 | 9.0 | 2 | 4.9 | 1.54 | 10 | 3 | 50 | 2 | 690C/890C |

Evaluation 3

This series of evaluations was prepared to demonstrate the effect of varying the polymerizable surfactant monomer in the monomer mixture used to prepare the polymer binder of the present invention. The results are presented in Table 3. The results in Table 3 indicate all inks were printable and had good properties.

Evaluation 4

This series of evaluations was prepared to demonstrate the effect of varying the particle size of the polymer binder used in the inks of the present invention. The results are presented in Table 4.

Particle sizes from 200 to 350 nm were evaluated. The results in Table 4 show that over this narrow range of particle size, all samples were printable. The print quality of the 250 nm variant was slightly better as was its HR and WR. OD seems to reach a minimum in this range. We could expect acceptable good print quality over a wider range of particle size.

Evaluation 5

This series of evaluations was prepared to demonstrate the effect on the ink of the present invention of varying the carboxylic acid monomer used in the monomer mix from which the polymer binder is made. The results are presented in Table 5.

The results in Table 5 show that MAA appears to be the best for the overall balance of OD, WR, HR and print quality.

TABLE 3

5% MAA, Tg = −20, 250 nm

|  | Surfactant Type/level | Inkjet Formulation | Print Quality | Optical Density | Highlighter Resistance | Wet Rub | Print Operability | HP Printer |
|---|---|---|---|---|---|---|---|---|
| Example 14 | TREM LF-40/0.1% | 2 | 5.1 | 1.45 | 10 | 3 | 4 | 690C/890C |
| Example 15 | TREM LF-40/0.2% | 2 | 4.3 | 1.38 | 7 | 3 | 3 | 690C |
| Example 16* | STEPAN 2263-26/0.1% | 2 | 5.3 | 1.46 | 10 | 4 | 3 | 690C |
| Example 17* | STEPAN 2263-27B/0.2% | 2 | 4.8 | 1.43 | 10 | 2 | 3 | 690C |
| Example 18* | STEPAN 2263-28B/0.1% | 2 | 5.4 | 1.49 | 10 | 4 | 3 | 690C |
| Example 19* | STEPAN AU-1/0.2% | 2 | 5.6 | 1.50 | 10 | 4 | 4 | 690C/890C |
| Example 20* | STEPAN AU-5/0.2% | 2 | 5.4 | 1.49 | 10 | 4 | 3 | 690C |
| Example 21* | STEPAN NMS-7/0.2% | 2 | 5.1 | 1.45 | 10 | 3 | 3 | 690C |
| Example 22 | ammonium di-(tricyclo(5.2.1.0 2,6)dec-3-en-(8 or 9)oxyethyl) sulfosuccinate | 2 | 5.1 | 1.41 | 10 | 3 | 3 | 690C |
| Example 23 | ammonium di-(tricyclo(5.2.1.0 2,6)dec-3-en-(8 or 9)) sulfosuccinate | 2 | 4.3 | 1.42 | 6 | 4 | 3 | 690C |

TABLE 4

2.5% MAA, 0.1% TREM, Tg = −20

|  | Particle Size | Inkjet Formulation | Print Quality | Optical Density | Highlighter Resistance | Wet Rub | Print Operability | HP Printer |
|---|---|---|---|---|---|---|---|---|
| Example 24 | 217 | 2 | 3.5 | 138 | 6 | 2 | 2 | 690C |
| Example 25 | 261 | 2 | 4.5 | 1.36 | 8 | 3 | 3 | 690C |
| Example 26 | 280 | 2 | 3.0 | 1.34 | 5 | 1 | 2 | 690C |
| Example 27 | 323 | 2 | 3.6 | 1.44 | 5 | 3 | 2 | 690C |

TABLE 5

250 nm, −20 Tg, 5% acid

|  | Acid Type | Surfactant | Inkjet Formulation | Print Quality | Optical Density | Highlighter Resistance | Wet Rub | Print Operability | HP Printer |
|---|---|---|---|---|---|---|---|---|---|
| Example 35 | MAA | TREM, 0.1% | 2 | 5.6 | 1.40 | 10 | 4 | 4 | 690C/890C |
| Example 36* | AA | AU-1, .2% | 2 | 4.5 | 1.38 | 7 | 4 | 3 | 690C |
| Example 37 | o-AA | TREM, 0.1% | 2 | 4.7 | 1.32 | 10 | 3 | 2 | 690C |
| Example 38* | 1.5% IA/ 3.0% AA | AU-1, .2% | 2 | 5.1 | 1.42 | 10 | 3 | 3 | 690C |
| Example 39* | IA | AU-1, .2% | 2 | 5.1 | 1.42 | 10 | 3 | 3 | 690C |

Evaluation 6

This series of evaluations was prepared to demonstrate the effect of varying the glass transition temperature of the polymer binder used in the inks of the present invention. The results are presented in Table 6.

The results in Table 6 show that Tg has little effect on print operability. OD appears to improve with higher Tg, and HR and WR appear to improve with lower Tg. The WR and HR performance improves as Tg is lowered to somewhere between −6C and −20C (between ca. 15 and 40C degrees below ambient temperature). Below this point, the WR and HR do not improve. Using a coalescing solvent and/or a high temperature fuser, we can get outstanding WR performance from the Tg=60C sample. There appears to be no inherent limit on how far one can increase the Tg and still get adequate WR using coalescing/fusing of the printed ink.

Evaluation 7

This series of evaluations was prepared to demonstrate the effect of varying the hydrophilic nature of the polymer binder used in the inks of the present invention. The results are presented in Table 7.

Hydrophilic monomers HEA and HEMA were added to the polymer backbone composition in an attempt to improve print quality. The expectation was that a more hydrophilic composition would improve the rewet of material encrusted on the printhead and possibly improve the latex particle dispersion as well. Our data in Table 7 shows that WR, HR, OD and print quality all become poorer as the level of hydrophilic monomer is increased. However, acceptable performance can be obtained in the presence of these monomers.

TABLE 6

5% MAA, 0.2% TREM, 250 nm

|  | Tg | Inkjet Formulation | Print Quality (fused/unfused) | Optical Density (fused/unfused) | Highlighter Resistance (fused/unfused) | Wet Rub (fused/unfused) | Print Operability | HP Printer |
|---|---|---|---|---|---|---|---|---|
| Example 28 | −31 | 2 | 5.0 | 1.39 | 10 | 3 | 3 | 690C |
| Example 29 | −20 | 2 | 5.3 | 1.40 | 10 | 3 | 4 | 690C |
| Example 30 | −6 | 2 | 4.6 | 1.45 | 8 | 3 | 3 | 690C |
| Example 31 | 0 | 2 | 3.3/2.6 | 1.44/1.45 | 3/2 | 4/2 |  | 690C |
| Example 31A | 0 | 2 | 3.8/2.6 | 1.44/1.46 | 5/2 | 4/2 |  |  |
| Example 32 | 20 | 2 | 3.4/2.1 | 1.53/1.47 | 3/1 | 4/1 |  | 690C |
| Example 33 | 40 | 2 | 3.6/2.1 | 1.49/1.46 | 4/1 | 4/1 |  | 690C |
| Example 34 | 60 | 2 | 4.1/2.2 | 1.50/1.46 | 6/1 | 4/1 |  | 690C |

TABLE 7

250 nm, 5% MAA, 0.2% STEPAN AU-1 (unless indicated)

|  | Monomer | Inkjet Formulation | Print Quality | Optical Density | Highlighter Resistance | Wet Rub | Print Operability | HP Printer |
|---|---|---|---|---|---|---|---|---|
| Example 40 | None | 2 | 5.6 | 1.40 | 10 | 4  0.1% TREM LF-40 | 4 | 690C |
| Example 41* | None | 2 | 5.3 | 1.39 | 10 | 4 | 3 | 690C |

TABLE 7-continued 250 nm, 5% MAA, 0.2% STEPAN AU-1 (unless indicated)

| | Monomer | Inkjet Formulation | Print Quality | Optical Density | Highlighter Resistance | Wet Rub | Print Operability | HP Printer |
|---|---|---|---|---|---|---|---|---|
| Example 42* | 1% HEMA | 2 | 5.1 | 1.40 | 10 | 4 | 2 | 690C |
| Example 43* | 2% HEMA | 2 | 5.1 | 1.40 | 10 | 4 | 2 | 690C |
| Example 44* | 4% HEMA | 2 | 4.3 | 1.38 | 8 | 3 | 2 | 690C |
| Example 45* | 8% HEMA | 2 | 4.2 | 1.30 | 8 | 3 | 2 | 690C |
| Example 46* | 1% HEA | 2 | 4.6 | 1.40 | 9 | 3 | 2 | 690C |
| Example 47* | 2% HEA | 2 | 4.6 | 1.43 | 8 | 4 | 2 | 690C/890C |
| Example 48* | 4% HEA | 2 | 4.2 | 1.33 | 7 | 4 | 2 | 690C |
| Example 49* | 8% HEA | 2 | 0 | NA | NA | NA | 0 | |

Evaluation 8

This series of evaluations was prepared to demonstrate the effect of varying the binder neutralization in the inks of the present invention. The results are presented in Table 8.

All previous binder preparations were made with ammonia for in-process neutralization. In this series, we used different alkali metal hydroxides to complete the neutralization of the formulated inks. Some advantages were seen for ammonia and sodium for OD, WR and print quality.

Evaluation 9

This series of evaluations was prepared to demonstrate the effect of varying the pigment used in the inks of the present invention. The results are presented in Table 9. The results in Table 9 suggest that the effects that we have seen with carbon black pigmented inks of the present invention are repeatable with other pigments.

TABLE 8

Binder neutralization, 250 nm, 5% MAA, 0.1% TREM LF-40

| | Base | Inkjet Formulation | Print Quality | Optical Density | Highlighter resistance | Wet Rub | Print Operability | HP Printer |
|---|---|---|---|---|---|---|---|---|
| Example 50 | NH3 | 2 | 5.3 | 1.41 | 10 | 4 | 3 | 690C |
| Example 51 | LiOH (post add) | 2 | 4.9 | 1.25 | 10 | 4 | 2 | 690C |
| Example 52 | KOH (post add) | 2 | 4.7 | 1.27 | 10 | 3 | 2 | 690C |
| Example 53 | NaOH (post add) | 2 | 5.3 | 1.37 | 10 | 4 | 3 | 690C |

TABLE 9

| Ink Formulation | gms | Dispersion Color | Print Operability |
|---|---|---|---|
| n-MP | 1.6 | cyan - Polytribo Acryjet 157 | 2 |
| PEG | 1.0 | magenta - Polytribo Acryjet 127 | 2 |
| EG-1 | 0.5 | yellow - Polytribo Acryjet 747 | 2 |
| Propanediol | 12 | | |
| Dispersant | 62 | | |
| Surfynol 104E | 01 | | |
| Example 50 | 5.0 | | |
| DI water | 142 | | |

What is claimed is:

1. An ink composition comprising a colorant and a polymeric binder wherein the polymeric binder is an emulsion-polymerized addition copolymer formed from a monomer mixture consisting essentially of ethylenically unsaturated monomers including from more than 4 to 15 wt % based on the weight of said mixture of at least one ethylenically unsaturated carboxylic acid functional monomer, and from 0.05 to 5 wt % based on the weight of said mixture of at least one polymerizable surfactant monomer comprising hydrophobic and hydrophilic functional groups, wherein said hydrophilic functional group comprises a polymerizable group within it.

2. An ink composition as claimed in claim 1, wherein said ink composition is an ink jet ink.

3. The ink composition as claimed in claim 2, wherein said hydrophilic functional group comprises within it a polymerizable group which is an ethylenically unsaturated amine cation.

4. The ink composition as claimed in claim 3, wherein the polymerizable surfactant is selected from the group of polymerizable surfactant monomers consisting of allylammonium $C_8$–$C_{22}$ alkyl-12EO-phosphate; allylammonium $C_8$–$C_{22}$ alkyl-7EO-phosphate; allylammonium $C_8$–$C_{22}$ alkyl-3EO-phosphate; allylammonium linear-dodecyl benzene sulfonate; allylammonium lauryl-sulfate; allyl ammonium alkylether-sulfate; allyl ammonium salts of $C_8$–$C_{22}$ carboxylic acids; allyl ammonium salts of succinate ester surfactants and allyl ammonium salts of maleate ester surfactants.

5. The ink composition as claimed in claim 2, wherein the acid functional monomer is one or more monomers selected from the group consisting of $C_3$ to $C_{20}$ ethylenically unsaturated carboxylic acids, their basic salts, and mixtures of such monomers.

6. The ink composition as claimed in claim 2, wherein said monomer mixture comprises one or more monomers selected from the group of monomers consisting of substituted ($C_1$ to $C_{50}$) alkyl (meth) acrylates, unsubstituted ($C_1$ to $C_{50}$) alkyl (meth) acrylates, styrene, substituted styrenes, vinyl acrylates, vinyl acetates, fluoromethacrylates, acrylamide, substituted acrylamides, methacrylamides and substituted methacrylamides.

* * * * *